US012574105B2

(12) United States Patent
Mendelsohn

(10) Patent No.: US 12,574,105 B2
(45) Date of Patent: Mar. 10, 2026

(54) SYSTEMS AND METHODS FOR POINTING A STEERABLE ANTENNA SYSTEM ONBOARD A SATELLITE

(71) Applicant: ViaSat, Inc., Carlsbad, CA (US)

(72) Inventor: Aaron J. Mendelsohn, Dana Point, CA (US)

(73) Assignee: Viasat, Inc., Carlsbad, CA (US)

( * ) Notice: Subject to any disclaimer, the term of this patent is extended or adjusted under 35 U.S.C. 154(b) by 333 days.

(21) Appl. No.: 18/554,741

(22) PCT Filed: Mar. 22, 2022

(86) PCT No.: PCT/US2022/021431
§ 371 (c)(1),
(2) Date: Oct. 10, 2023

(87) PCT Pub. No.: WO2022/221008
PCT Pub. Date: Oct. 20, 2022

(65) Prior Publication Data
US 2024/0129026 A1     Apr. 18, 2024

Related U.S. Application Data

(60) Provisional application No. 63/175,549, filed on Apr. 15, 2021.

(51) Int. Cl.
*H04B 7/185* (2006.01)
*H04B 7/204* (2006.01)
(52) U.S. Cl.
CPC ..... *H04B 7/18515* (2013.01); *H04B 7/18519* (2013.01); *H04B 7/2041* (2013.01)

(58) Field of Classification Search
CPC ............ H04B 7/18515; H04B 7/18519; H04B 7/2041; H04B 7/18513
See application file for complete search history.

(56) References Cited

U.S. PATENT DOCUMENTS

| | | | |
|---|---|---|---|
| 8,723,724 B2 | 5/2014 | Mendelsohn et al. | |
| 9,748,989 B1 * | 8/2017 | Freedman | H04B 1/12 |
| 10,461,409 B1 | 10/2019 | Burr | |

(Continued)

FOREIGN PATENT DOCUMENTS

EP          2119047 A1    11/2009

OTHER PUBLICATIONS

"PCT Search Report and Written Opinion for PCT/US2022/021431", Jul. 11, 2022, 11 pages.

*Primary Examiner* — William Kelleher
*Assistant Examiner* — Kenneth W Good
(74) *Attorney, Agent, or Firm* — Murphy, Bilak & Homiller, PLLC

(57) ABSTRACT

Systems and methods disclosed herein for pointing a steerable antenna system (22) onboard a satellite (10) exploit advantageous image-processing techniques that provide a computationally-efficient and accurate way of determining the pointing error of the steerable antenna system (22) and determining corresponding pointing corrections. Received-signal power measurements for individual array elements in an antenna array of the steerable antenna system provide the basis for forming a power-distribution image (70) that reveals where an uplink signal (42) falls on the array (50), which in turn provides a basis for determining the appropriate pointing correction.

15 Claims, 14 Drawing Sheets

(56) References Cited

U.S. PATENT DOCUMENTS

| | | | |
|---|---|---|---|
| 2012/0249366 A1* | 10/2012 | Pozgay | H04B 7/18571 |
| | | | 342/354 |
| 2015/0312771 A1* | 10/2015 | Li | H04W 24/02 |
| | | | 455/446 |

* cited by examiner

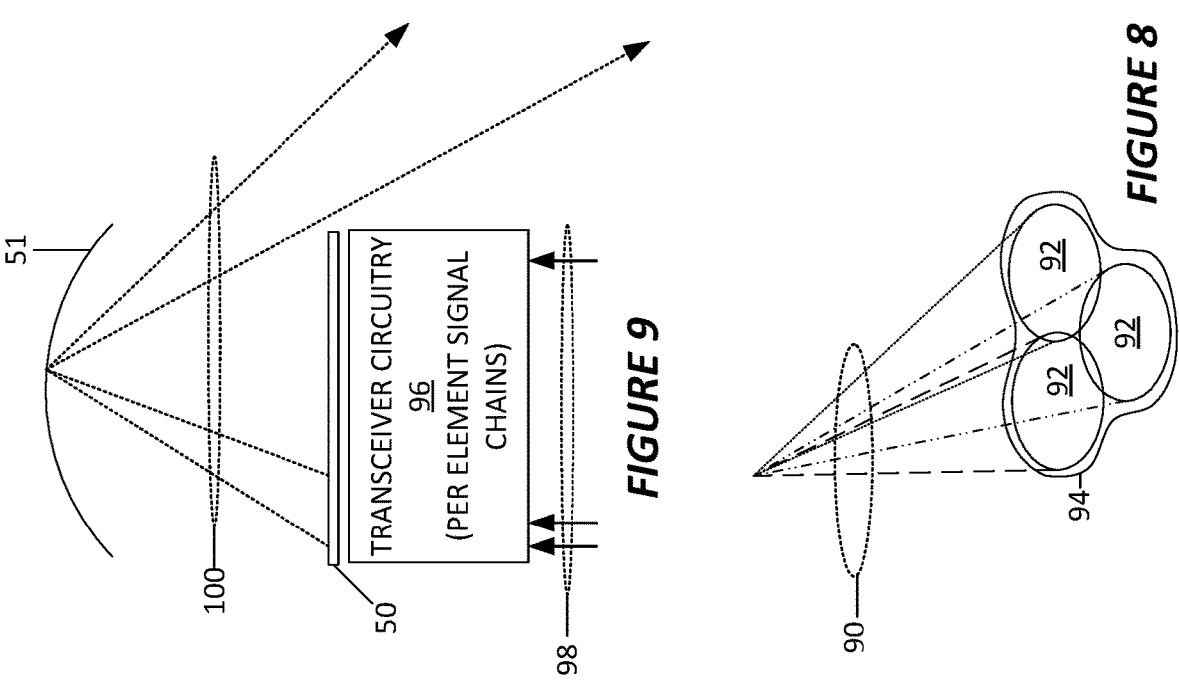

51

100

50

TRANSCEIVER CIRCUITRY
96
(PER ELEMENT SIGNAL CHAINS)

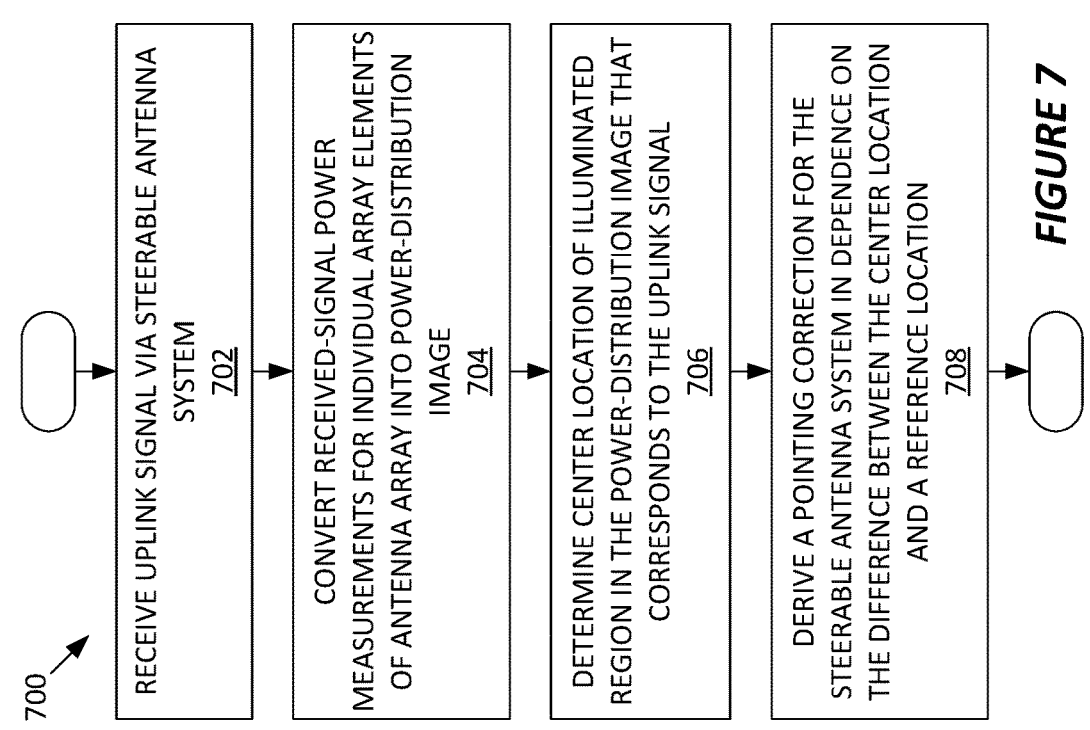

700

RECEIVE UPLINK SIGNAL VIA STEERABLE ANTENNA SYSTEM
702

CONVERT RECEIVED-SIGNAL POWER MEASUREMENTS FOR INDIVIDUAL ARRAY ELEMENTS OF ANTENNA ARRAY INTO POWER-DISTRIBUTION IMAGE
704

DETERMINE CENTER LOCATION OF ILLUMINATED REGION IN THE POWER-DISTRIBUTION IMAGE THAT CORRESPONDS TO THE UPLINK SIGNAL
706

DERIVE A POINTING CORRECTION FOR THE STEERABLE ANTENNA SYSTEM IN DEPENDENCE ON THE DIFFERENCE BETWEEN THE CENTER LOCATION AND A REFERENCE LOCATION
708

*FIGURE 7*

☐ BEAM COVERAGE AREA
◯ CURRENT ANTENNA BORESIGHT
● NOMINAL ANTENNA BORESIGHT

1200

CHOOSE GROUND STATION 1202

VERIFY CONDITIONS 1204

DETERMINE POINTING ERROR 1206

APPLY POINTING CORRECTION 1208

1100

MAP UPLINK POWER TO FEED COORDINATES AND GENERATE INITIAL IMAGE 1102

APPLY FILTERING 1104

UPSCALE/RESIZE 1106

APPLY FILTERING 1108

BINARIZE 1110

CALCULATE CENTER (CENTROID) 1112

72

| 0 | 104 | 0 | 124 | 0 | 124 | 0 | 104 | 0 | 65 | 0 |
| 88 | 0 | 118 | 0 | 128 | 0 | 118 | 0 | 88 | 0 | 44 |
| 0 | 105 | 0 | 126 | 0 | 126 | 0 | 105 | 0 | 67 | 0 |
| 86 | 0 | 116 | 0 | 127 | 0 | 116 | 0 | 86 | 0 | 43 |
| 0 | 100 | 0 | 121 | 0 | 121 | 0 | 100 | 0 | 62 | 0 |
| 78 | 0 | 108 | 0 | 118 | 0 | 108 | 0 | 78 | 0 | 37 |
| 0 | 89 | 0 | 109 | 0 | 109 | 0 | 89 | 0 | 52 | 0 |
| 64 | 0 | 93 | 0 | 103 | 0 | 93 | 0 | 64 | 0 | 27 |
| 0 | 71 | 0 | 90 | 0 | 90 | 0 | 71 | 0 | 38 | 0 |

INITIAL
IMAGE

IMAGE AFTER BLOCK 1610

IMAGE BEFORE BLOCK 1610

IMAGE AFTER BLOCK 1620

IMAGE AFTER BLOCK 1614, 1616, 1618

SYSTEMS AND METHODS FOR POINTING A STEERABLE ANTENNA SYSTEM ONBOARD A SATELLITE

TECHNICAL FIELD

Systems and methods disclosed herein relate to pointing a steerable antenna system onboard a satellite.

BACKGROUND

As demand for satellite communications continues to grow, the use of spot beams in satellite systems has become increasingly popular. A spot beam is a modulated satellite beam focused on a limited geographic region of the Earth. By reducing the coverage area of the beam, a more directional antenna may be used by the satellite to transmit the beam to Earth. This higher gain associated with a spot beam may produce better signal-to-noise (SNR) ratio at a user terminal, which allows for higher rates of data transfer between the satellite and terminal. Also, the smaller size of spot beams allows for frequency reuse with limited inter-beam interference, thereby providing for even greater increases in data throughput at a satellite.

While spot beams can be very useful in areas of high demand, they may be susceptible to pointing errors. Satellite antenna movement within even a few thousandths of a degree may substantially change the coverage area of a spot beam on the Earth. Moreover, it is often the case that multiple spot beams are transmitted in a predetermined pattern from the satellite to various intended coverage areas. Thus, an antenna pointing error at the satellite may detrimentally reduce the quality of communications over multiple spot beams simultaneously.

In the foregoing circumstances and in other scenarios, therefore, there is a need for determining the pointing error of a steerable antenna system, with U.S. Pat. No. 8,723,724 B2 detailing techniques for pointing—orienting—a satellite antenna. Among the many challenges associated with maintaining a correct pointing direction for a satellite antenna are the complexities and durations associated with the procedure(s) used for determining pointing errors and the signaling needed for making such determinations.

SUMMARY

Systems and methods disclosed herein for pointing a steerable antenna system onboard a satellite exploit advantageous image-processing techniques that provide a computationally-efficient and accurate way of determining the pointing error of the steerable antenna system and determining corresponding pointing corrections. Received-signal power measurements for individual array elements in an antenna array of the steerable antenna system provide the basis for forming a power-distribution image that reveals where an uplink signal falls on the array, which in turn provides a basis for determining the appropriate pointing correction.

One embodiment comprises a method of operation by a control system of a satellite. The method includes: (a) receiving an uplink signal that illuminates a particular region of an antenna array in dependence on a current pointing direction of a steerable antenna system that includes the antenna array, and wherein the antenna array comprises a plurality of array elements arranged according to a feed grid; (b) converting received-signal power measurements made for individual array elements of the antenna array during reception of the uplink signal into a power-distribution image comprising pixels arranged on a pixel grid derived from the feed grid and having pixel values determined in dependence on the received-signal power measurements made for corresponding ones of the array elements; (c) determining a center location of an illuminated region in the power-distribution image that corresponds to the uplink signal, the center location expressed in feed-grid coordinates; and (d) deriving a pointing correction for the steerable antenna system in dependence on a difference between the center location and a reference location that also is expressed in feed-grid coordinates.

Another embodiment comprises a satellite having a steerable antenna system and a control system. The steerable antenna system includes an antenna array and is configured to receive an uplink signal that illuminates a particular region of the antenna array in dependence on a current pointing direction of the steerable antenna system. The antenna array comprises a plurality of array elements arranged according to a feed grid. Correspondingly, the control system is configured to: (a) convert received-signal power measurements made for individual array elements of the antenna array during reception of the uplink signal into a power-distribution image comprising pixels arranged on a pixel grid derived from the feed grid and having pixel values determined in dependence on the received-signal power measurements made for corresponding ones of the array elements; (b) determine a center location of an illuminated region in the power-distribution image that corresponds to the uplink signal, the center location expressed in feed-grid coordinates; and (c) derive a pointing correction for the steerable antenna system in dependence on a difference between the center location and a reference location that also is expressed in feed-grid coordinates.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 7 is a logic flow diagram of a method of operation for determining a power-distribution image, according to one embodiment.

FIG. 8 is a diagram illustrating an example set of forward user beams, as produced by an example steerable antenna system, according to one embodiment.

FIG. 9 is a block diagram of antenna-assembly details of an antenna assembly of a steerable antenna system forward beamforming, according to one embodiment.

DETAILED DESCRIPTION

Figures 1A, 1B, 2, 3:
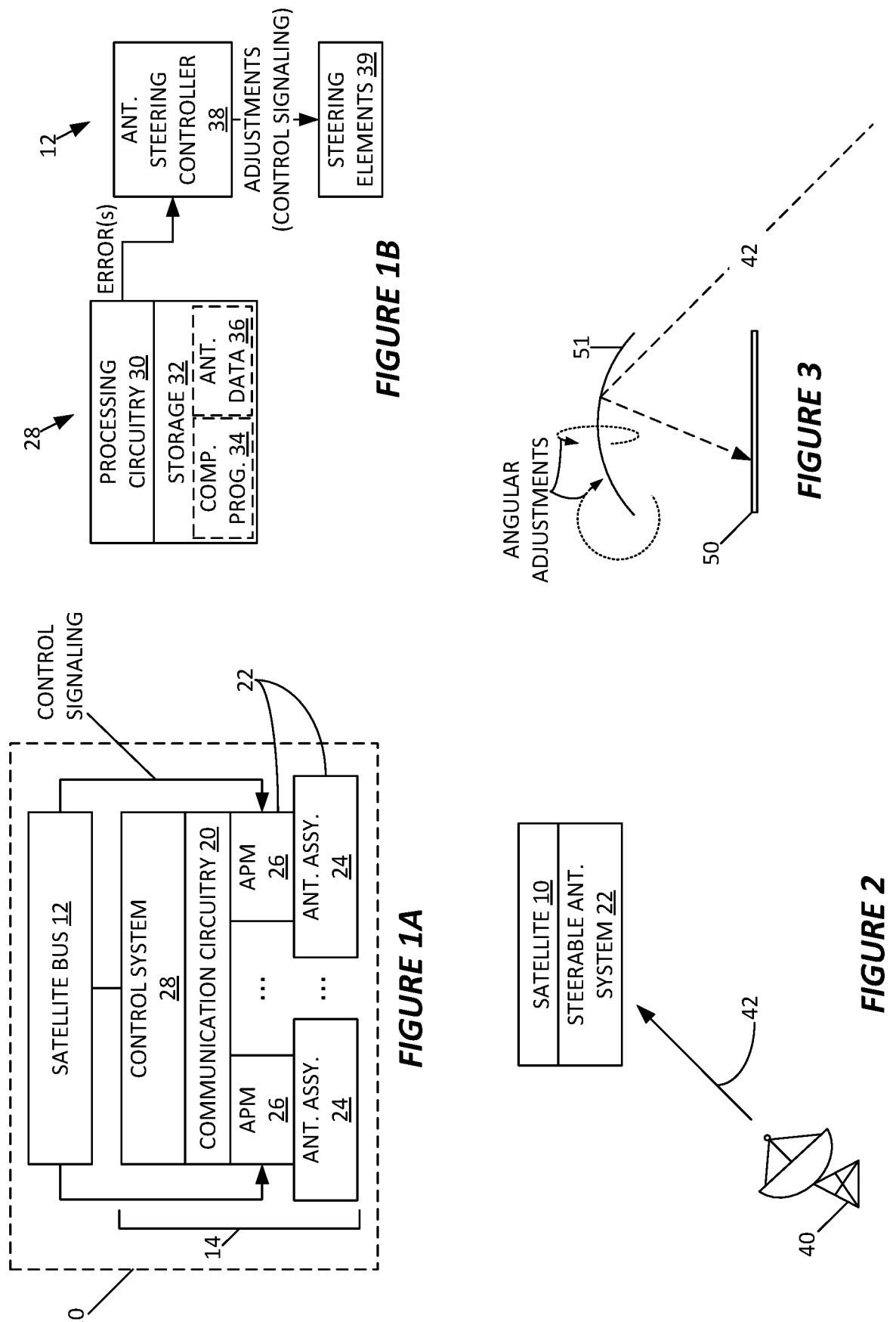
FIGS. 1A and 1B are block diagrams of a satellite configured for operation in a satellite communications system, according to one embodiment.
FIG. 2 is a block diagram of a terrestrial ground station configured for operation in a satellite communications system, according to one embodiment.
FIG. 3 is a block diagram of an antenna assembly of a steerable antenna system, according to one embodiment.

FIGS. 1A and 1B illustrate a satellite 10, according to one example embodiment, with the satellite 10 including a satellite bus 12 and a payload 14. The satellite bus 12 includes the electrical power system of the satellite 10, along with other spacecraft infrastructure, while the payload 14 comprises the communications equipment and associated antenna systems, for relaying signals between respective terrestrial stations, such as gateway terminals and user terminals.

Example entities in the payload include communications circuitry 20 and one or more steerable antenna systems 22. Each steerable antenna system 22 comprises, for example, an antenna assembly 24 and a corresponding antenna positioning module (APM) 26 that is operative to steer the antenna assembly 24. "Steering" encompasses a variety of techniques for changing the "pointing" direction of the antenna assembly 24, and each APM 26 comprises, for example, a motorized two-axis gimble or other steering element that performs commanded changes in the angular position of the antenna assembly 24 in two or more axes, e.g., to shift the geographic region on the surface of the Earth towards which the antenna assembly 24 is oriented.

The communication circuitry 20 carries communication signals in the forward direction—towards user terminals—and in the return direction—from the user terminals—and may comprise a plurality of transponders that provide signal pathways through the satellite 10. Transponder functions include, for example, signal amplification, filtering, and frequency conversion, such as converting between frequencies used for uplink transmission and frequencies used for downlink transmission.

A control system 28 performs a number of operations, including determining pointing errors with respect to any one or more of the steerable antenna systems 22. Pointing errors are reduced or eliminated by control circuitry comprised within the bus 12 translating the determined errors into corresponding steering adjustments and controlling the APM(s) 26 according to such adjustments, to perform antenna steering. Antenna steering may be understood as station keeping, wherein the satellite 10 compensates for changes in its attitude, to maintain a desired orientation of each antenna assembly 24. In other embodiments or scenarios, steering commands to an APM 26 provide for purposeful reorientation of the involved antenna assembly 24, e.g., to shift the terrestrial coverage area(s) provided by the antenna assembly 24. One or more embodiments of the satellite 10 use a phased-array antenna for one or more of the antenna systems 24, such that steering the antenna assembly 24 shifts the beams formed by the antenna assembly 24. Such shifts can be understood as shifting or otherwise moving the terrestrial beam footprints of the beams, which changes the terrestrial areas illuminated by the beams.

An example control system 28 comprises processing circuitry 30 and associated storage 32. The processing circuitry 30 comprises dedicated, fixed circuitry or programmatically-configured circuitry, or a mix of dedicated circuitry and programmatically-configured circuitry. For example, one or more microprocessors or other digital processors are specially adapted to carry out some or all of processing described herein for antenna steering, based on the execution of stored computer program instructions.

Correspondingly, in one or more embodiments, the storage 32 comprises one or more types of computer-readable media, such as a mix of volatile memory for use in program execution—working memory—and nonvolatile memory for longer-term storage of one or more computer programs 34 containing the aforementioned computer program instructions. The storage 32 in one or more embodiments also stores satellite provisioning information or other types of configuration data, such as antenna data 36.

FIG. 1B depicts a particular example arrangement applicable to one or more embodiments, wherein control system 28 determines pointing errors, e.g., expressed in terms of azimuthal and elevational errors, and outputs corresponding error signaling to an antenna steering controller 38 comprised within the satellite bus 12. The antenna steering controller 38 comprises, for example, a programmed microprocessor, an Application Specific Integrated Circuit (ASIC), a Field Programmable Array (FPGA), or other digital processing circuit, along with supporting power and interface circuitry.

Processing performed by the antenna steering controller 38 includes translating the determined pointing errors for a steerable antenna system 22 into corresponding adjustments, e.g., steering commands, which are then applied to the steering element(s) 39 in the involved APM 26. As a non-limiting example, the steerable antenna system 22 includes a reflector having azimuthal and elevational angles that are controlled by stepper motors in a two-axis gimble. Steering-angle adjustments in this context comprise changing the reflector angle by commanding determined numbers of motor steps, which correspond to, e.g., millidegrees of angular adjustment.

FIG. 2 illustrates an example scenario of antenna steering, based on the satellite 10 receiving an uplink signal 42 from a terrestrial terminal 40, which also may be referred to as a ground station 40. The terrestrial terminal 40 comprises, for example, a satellite access node (SAN), which also may be referred to as a gateway terminal. SANs form part of the ground segment of a satellite communications system and interface directly or indirectly with external communication networks, such as the Internet or other Public Data Networks (PDNs), the Public Switched Telephone Network (PSTN), Public Land Mobile Networks (PLMNs), etc.

In at least one embodiment, the uplink signal 42 serves as a pointing reference for a steerable antenna system 22 onboard the satellite 10. Particularly, the satellite 10 evaluates the current pointing direction of the steerable antenna system 22 by evaluating how the uplink reference signal impinges on the antenna assembly 24 included in the steerable antenna system 22. FIG. 3 introduces example details that provide a context for such evaluations.

An example antenna assembly 24 included in each steerable antenna system 22 comprises, for example, an antenna array 50 and an associated reflector 51. As seen in FIG. 3, the uplink signal 42 impinges on the reflector 51, which reflects it onto the antenna array 50. As such, the portion of the antenna array 50 that is illuminated by the uplink signal 42 depends on the orientation of the reflector 51 relative to the antenna array 50. As suggested in FIG. 3, the reflector 51 may be motorized or otherwise adjustable around one or more axes. Changing the orientation of the reflector 51 relative to the antenna array 50 effectively changes the pointing direction of the antenna array 50, and such changes therefore shift which portion of the antenna array 50 is illuminated by the uplink signal 42.

Figure 4:
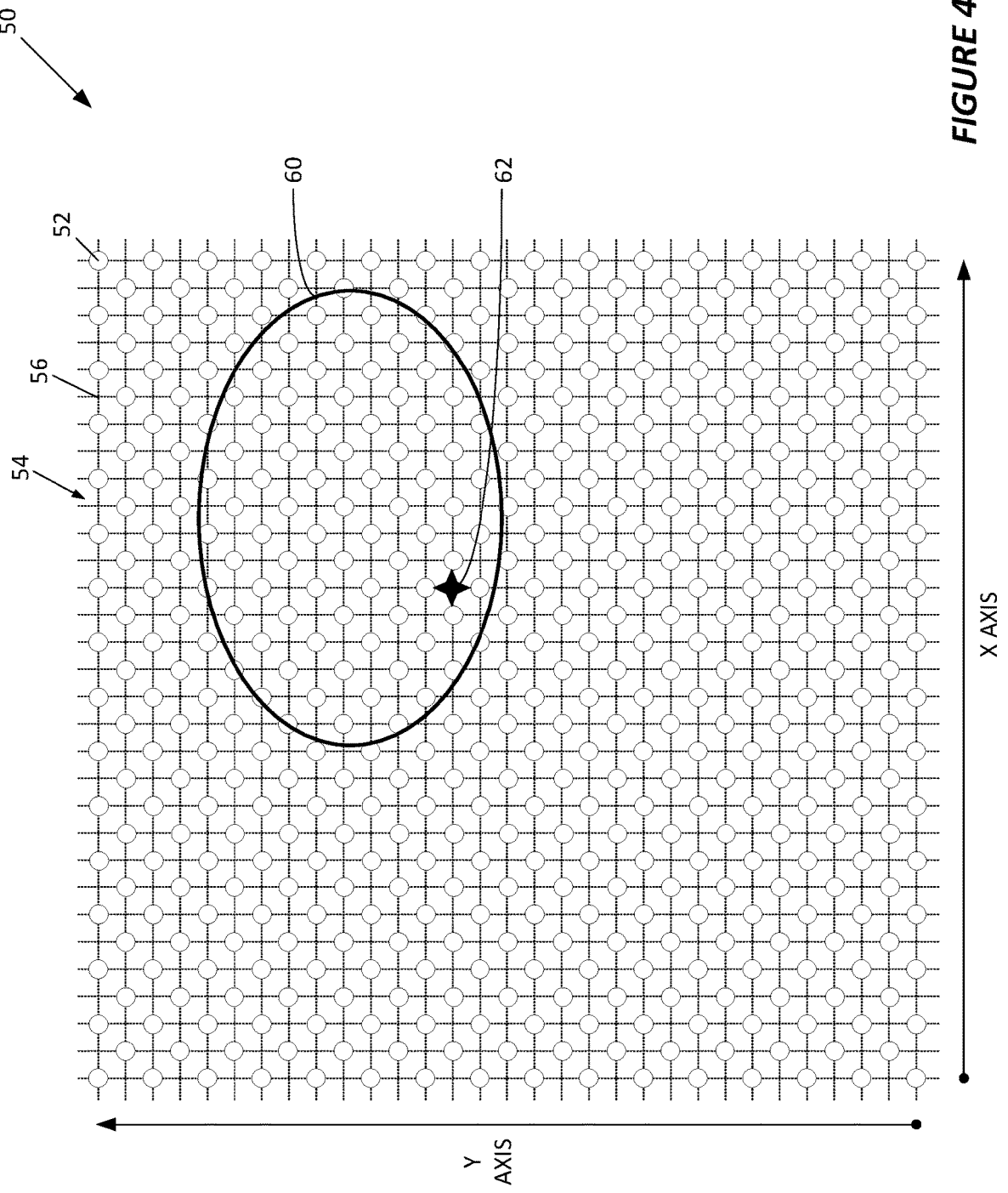
FIG. 4 is a block diagram of an antenna array and its associated feed grid, such as may be included in the antenna assembly of FIG. 3, according to one embodiment.

FIG. 4 offers an example illustration of such details by depicting the antenna array 50 in a plan view, i.e., looking directly at the face of the antenna array 50. As illustrated, the antenna array 50 comprises a plurality of array elements 52 arranged according to a feed grid 54, which can be understood as defining the geometric arrangement of individual array elements 52. As depicted, the feed grid 54 defines regularly spaced column lines and row lines and each row-column intersection represents a grid position 56 in the feed grid 54.

If the horizontal distance spanned by the plurality of feed-grid columns depicted in FIG. 4 is taken as the X axis and the vertical distance spanned by the plurality of feed-grid rows is taken as the Y axis, any particular grid position 56 in the feed grid 54 is defined by its X-Y coordinate, expressed as {x, y}. Here, {x, y} represents a physical position or coordinate within the feed grid 54.

The depicted embodiment of the antenna array 50 is based on a lattice arrangement of array elements 52 on the feed grid 54, where every other grid position 56 going row-wise or column-wise is occupied by an array element 52. In some embodiments, depending on involved signal frequencies and design requirements, all grid positions 56 are occupied by array elements 52, and it will be understood that the physical spacing of the grid positions 56 depends on the wavelengths of the signal frequencies of interest.

Each array element 52 is a radiating or receiving element, or both, and has a corresponding transmit or receive signal chain associated with it. In one or more embodiments, measurement circuitry onboard the satellite 10 is configured to measure received-signal power on each array element 52. In FIG. 4, the reference number "60" denotes the particular region—area—of the overall antenna array 50 that is illuminated by the uplink signal 42 for a current angular orientation of the reflector 51 relative to the antenna array 50—i.e., for a current pointing direction of the involved steerable antenna assembly 22. "Illuminated" in this context refers to which array elements 52 in the antenna array 50 register received-signal power levels above some minimum threshold, with respect to the uplink signal 42.

The reference number "62" denotes a reference location that represents the nominal center of the illuminated region 60, if the steerable antenna system 22 was pointed correctly. That is, the current pointing error or alignment error of the steerable antenna system 22 is represented by the extent that the grid position 56 closest to the geometric center of the illuminated region 60 is not at the grid position 56 designated as the reference location 62. The reference location 62 is expressed in the X-Y coordinates of the feed grid 54.

An "imaging" technique disclosed herein offers both accuracy and efficiency in determining the pointing error. Effectively, the technique forms an image corresponding to the antenna array 50, where pixels in the image correspond with array elements 52 in the antenna array 50 and are illuminated or not illuminated in dependence on the received-signal power registered on the corresponding array elements 52 during reception of the uplink signal 42. The image is or represents a power distribution profile for the antenna array.

As such, the image will contain an illuminated region corresponding to the array elements 52 that registered more than some minimum level of received-signal power during reception of the uplink signal 42. In this regard, multiple power measurements may be made with respect to each array element 52 during a reception interval, and averaged or otherwise filtered, to obtain a final power measurement value that is used as an input to the image generating process.

The pixel grid that defines the image has a defined correspondence with the feed grid 54, meaning that the reference location 62 can be projected into the pixel grid and the center of the illuminated region in the image that represents the uplink signal 42 can be compared to the projected reference location to compute a pointing error of the steerable antenna system 22 being evaluated. The image-processing technique can be performed independently, for each steerable antenna system 22 onboard the satellite 10.

Figures 5, 6:
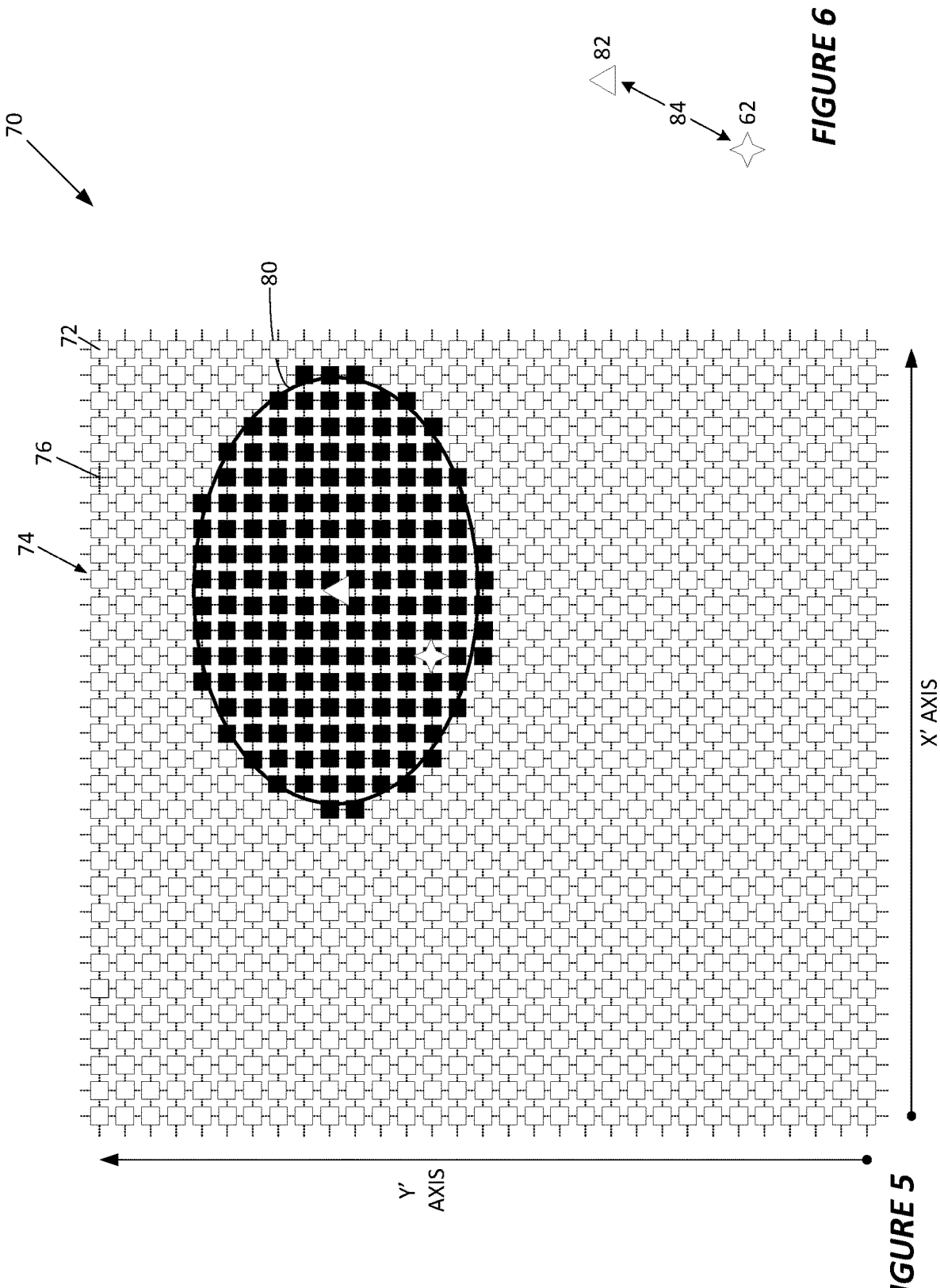
FIG. 5 is a diagram of a power-distribution image, as generated for pointing-error determinations according to one embodiment.
FIG. 6 is a diagram of a center of an illuminated region within a power-distribution image in relative position to a nominal or desired center, according to one embodiment.

FIG. 5 illustrates the foregoing example details by depicting an image 70 having an X' axis and a Y' axis and comprising a plurality of pixels 72 arranged on a pixel grid 74 that corresponds to the feed grid 54. "Corresponds to" in this context means that there is a defined mapping or correspondence between each grid position 76 in the pixel grid 74 and each grid position 56 in the feed grid 54. For example, the image 70 may have the same resolution as the feed grid 54, meaning that there is one grid position 76 for each grid position 56 in the feed grid 54. In at least one embodiment, the image 70 is a higher resolution or upscaled image, meaning that there are more grid positions 76 in the pixel grid 74 than there are grid positions 56 in the feed grid 54—e.g., there may be four grid positions 76 for every grid position 56. However, even with upscaling, there remains a defined mapping or correspondence between grid positions 76 in the pixel grid 74 and grid positions 56 in the feed grid 54. As such, the numeric value of every pixel 72 in the image 70 depends on the received-signal power level registered on the corresponding array element(s) 52 in the antenna array 50 during the measurement interval used to obtain the image. The dependency may be a quantized relationship, e.g., a given pixel 72 may be considered as being "off" (not illuminated) or "on" (illuminated) as a function of whether the power level(s) registered for the corresponding array element(s) 52 satisfied some minimum threshold level.

Thus, the image 70 may be referred to as a "power-distribution image" and as seen in FIG. 5, it contains an illuminated region 80 corresponding to the uplink signal 42. Note that in this context, an illuminated pixel 72 has a numeric value resulting from the array element(s) 52 on which it depends having registered more than the minimum threshold level of received signal power during the interval in which the uplink signal 42 is received. The center of the illuminated region 80, which may be computed geometrically, e.g., as the centroid of the illuminated region 80 is represented by a triangle shape in the figure, shown as "82" in FIG. 6, and the reference location 62 as projected into the pixel grid 74 is represented by a star shape. The difference 84 between the center location 82 of the illuminated area 80 and the reference location 62 represents the current pointing error of the steerable antenna system 22.

FIG. 7 illustrates a method 700 of operation by the control system 28 of the satellite 10, consistent with the foregoing examples. Certain operations may be performed in an order other than suggested and the method 700 may be performed as part of ongoing satellite operations and repeated on a recurring basis, and may be carried out independently with respect to different steerable antenna systems 22 onboard the satellite 10.

The method 700 includes receiving (Block 702) an uplink signal 42 that illuminates a particular region 60 of an antenna array 50 in dependence on a current pointing direction of a steerable antenna system 22 that includes the antenna array 50. The antenna array 50 comprises a plurality of array elements 52 arranged according to a feed grid 54. Further, the method 700 includes converting (Block 704) received-signal power measurements made for individual array elements 52 of the antenna array 50 during reception of the uplink signal 42 into a power-distribution image 70 comprising pixels 72 arranged on a pixel grid 74 derived from the feed grid 54 and having pixel values determined in dependence on the received-signal power measurements made for corresponding ones of the array elements 52.

For example, with no upscaling or before performing upscaling, there is a one-to-one correspondence between the feed grid 54 and the pixel grid 74, meaning that each grid position 76 in the pixel grid 74 maps directly to one grid position 56 in the feed grid 54. If that grid position 56 is occupied, then the value of the pixel 72 depends on the received-signal power measurements made for the occupying array element 52. If the grid position 56 is unoccupied, then the value of the pixel 72 is calculated, at least initially, in dependence on the values of the adjacent pixels 72, corresponding to occupied grid positions 56 in the feed grid 54. Of course, any initially calculated pixel values may be revised, e.g., as a consequence of filtering, upscaling, and binarization, any or all of which may be performed in some embodiments of image generation.

However the pixel values are finalized, the method 700 continues with determining (Block 706) a center location 82 of an illuminated region 80 in the power-distribution image 70 that corresponds to the uplink signal 42, where the center location 82 is expressed in feed-grid coordinates. For example, the grid position 76 in the pixel grid 74 that is closest to the computed centroid of the illuminated region 80 is taken as the center location 82 and that location is then translated into feed-grid coordinates according to the mapping from the pixel grid 74 to the feed grid 54. From there, the method 700 continues with deriving (Block 708) a pointing correction for the steerable antenna system 22 in dependence on a difference 84 between the center location 82 and the reference location 62, which also is expressed in feed-grid coordinates.

The uplink signal 42 originates, for example, from a ground station 40 that serves as a pointing reference for the steerable antenna system 22 and the reference location 62 corresponds with a correct pointing direction of the steerable antenna system 22.

As noted earlier, the steerable antenna system 22 may receive more than just the uplink signal 42 during the interval in which it makes received-signal power measurements for generation of the power-distribution image 70. Consequently, there may be multiple illuminated regions within the power-distribution image 70, with the locations of those regions being dependent on the respective angles-of-arrival of the signals. Thus, in at least one embodiment, the method 700 includes identifying the illuminated region 80—i.e., the illuminated region corresponding to the uplink signal 42—from among two or more illuminated regions that are present in the power-distribution image 70, as a result of the steerable antenna system 22 receiving signal energy from more than one signal source while the received-signal power measurements are made.

In at least one embodiment, identifying the illuminated region 80 that corresponds with the uplink signal 42 comprises, for the two or more illuminated regions, comparing respective sizes of the two or more illuminated regions. This approach rests on the idea that the other signals are spurious and relatively weak, and therefore result in smaller illuminated regions in the power-distribution image 70.

Converting the received-signal power measurements into the power-distribution image 70 comprises, for example, mapping the individual received-signal power measurements to a first set of pixels 72. Each pixel 72 in the first set of pixels 72 corresponds to a populated grid position 56 in the feed grid 54 and has a pixel value corresponding to the received-signal measurement made for the array element 52 at that populated grid position 56. Continuing this example, converting the received-signal power measurements into the power-distribution image 70 further comprises creating an expanded, second set of pixels 72 encompassing the first set of pixels 72 and additional pixels 72 that correspond to unpopulated grid positions 56 in the feed grid 54. Each additional pixel 72 has a pixel value derived from one or more neighboring pixels in the first set of pixels 72.

Converting the received-signal power measurements into the power-distribution image 70 further comprises, in at least one embodiment, creating an up-sampled image by generating multiple pixels 72 for each grid position 56 in the feed grid 54. The method 700 in at least one such embodiment includes filtering the up-sampled image, to obtain the power-distribution image 70 used for determining the center location 82 of the illuminated region 80 in the power distribution image 70 that corresponds to the uplink signal 42.

Further, in one or more embodiments, forming the "final" power-distribution image 70 for evaluation includes binarizing the power-distribution image 70, and identifying, within the binarized power-distribution image 70, the illuminated region 80 that corresponds to the uplink signal 42. FIG. 5 suggests binarization, where each pixel 72 either is off—white in the figure—or is on—black in the figure.

In at least one embodiment of the method 700, the power distribution image 70 before binarization comprises pixels 72 having individual pixel values—numeric values—that are proportional to the received-signal power measured for the corresponding array elements 52, during an interval in which involved steerable antenna system 22 receives the uplink signal 42. For example, individual pixels 72 have a "zero" value if the array element(s) 52 they correspond with have received-signal power measurements below a certain threshold. However, individual pixels 72 have a non-zero value that is proportional to the received-signal power levels measured on their corresponding array elements 52.

Binarizing the power distribution image 70 means, with respect to each non-zero pixel 72 in the power distribution image 70, deciding whether to change the pixel value to zero (off) or to a maximum value (fully on) in dependence on whether the pixel value is above or below a defined binarization threshold. Merely as a non-limiting example, consider an approach where defined pixel values range from 0 to 100, with 0 corresponding to no received-signal power or received-signal power below some minimum power-level threshold, and 100 corresponding to received-signal power above some upper power-level threshold. Binarizing the power-distribution image 70 would then involve setting all pixels 72 having values below, say 20, to 0, and setting all pixels 72 having values above 20 to 100.

Deriving the pointing correction for the steerable antenna system 22 in one or more embodiments of the method 700 comprises computing a horizontal offset in feed-grid coordinates between the center location 82 and the reference location 62 on a horizontal axis defined by the feed grid 54, computing a vertical offset in feed-grid coordinates between the center location 82 and the reference location 62 on a vertical axis defined by the feed grid 54, and translating the horizontal and vertical offsets into corresponding azimuthal and elevational pointing adjustments for the steerable antenna system 22. These azimuthal and elevational pointing adjustments are, for example, servo commands for changing the angle of the reflector 51 of the involved antenna assembly 24, which, as noted, effectively changes the pointing direction of the antenna array 50 included in the antenna assembly 24. Thus, the method 700 in one or more embodiments includes actuating a steering mechanism of the steerable antenna system 22, according to one or more actuator control signals determined as a function of the pointing correction.

As shown in FIG. 8, the method 700 in one or more further embodiments includes the satellite 10 performing downlink beamforming via a steerable antenna system 22, to provide a set of forward user beams 90 defining corresponding forward user beam coverage areas 92. The forward user beam coverage areas 92 are the terrestrial footprints of the respective forward user beams 90, and the pointing direction of the steerable antenna system 22 defines the geographical coordinates of an aggregate coverage area 94 defined by the set of forward user beams 90.

In example operation, the satellite 10 uses a steerable antenna system 22 to perform downlink beamforming along the lines suggested in FIG. 8, although the number of forward user beams 90 may be large, e.g., more than five hundred. Here, "forward" refers to transmission toward user terminals served by the satellite 10, where such user terminals comprise set-top boxes or other data transceivers operating in respective ones of the beam coverage areas 94.

FIG. 9 provides further example details for downlink beamforming, where transceiver circuitry 96 comprising signal chains on a per antenna element basis with respect to the antenna array 50 included in the involved steerable antenna system 22 provides power amplification of element signals 98. Each element signal 98 corresponds to one of the array elements 52 in the antenna array 50 and is the same as the other element signals 98 except for having element-specific weighting in terms of amplitude and phase, such that the transmitted versions 100 of the element signals 98 form the forward user beams 90 in the far field, as a result of the patterns of constructive and destructive interference formed by the radiating signals 100. The weighting may be performed onboard the satellite 10 or on the ground, using ground-based beamforming.

Figure 10:
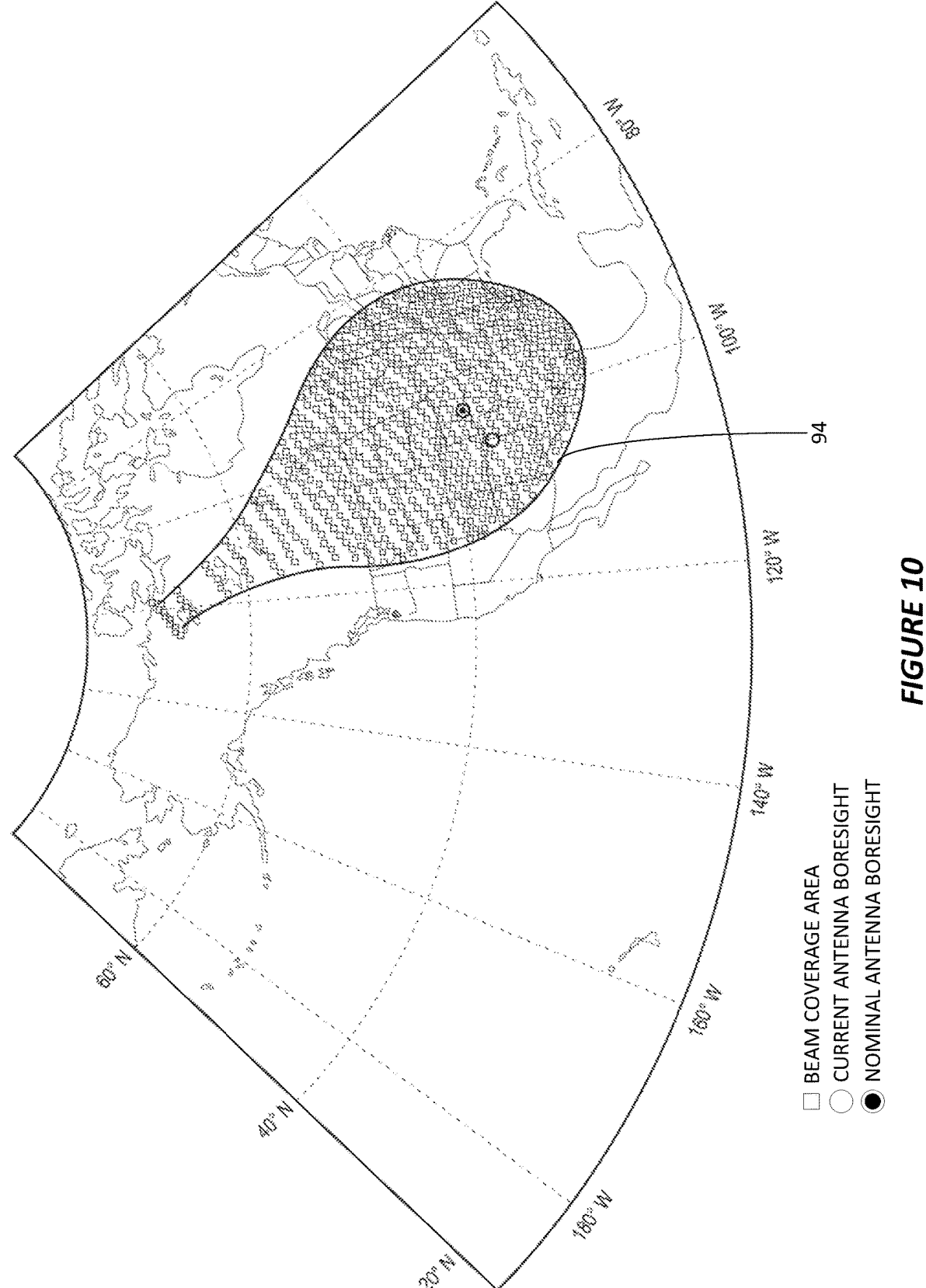
FIG. 10 is a diagram illustrating example beam coverage areas—spot beam areas—and a corresponding aggregate coverage area for forward beamforming, according to one embodiment.

FIG. 10 illustrates a more detailed example of beam-formed coverage using a steerable antenna system 22 of the satellite 10, where an aggregate coverage area 94 is formed by a plurality of beam coverage areas, depicted by the small squares in the diagram. The current boresight of the involved steerable antenna system 22 is shown, as indicated by the unfilled circle in the diagram. The filled circle indicates the nominal or intended boresight, and the method 700 provides the satellite 10 with an efficient and accurate mechanism for determining the pointing error.

As noted, the satellite 10 may have multiple steerable antenna systems 22 onboard, and the satellite 10 may perform the method 700 with respect to each steerable antenna system 22, based on receiving a respective uplink signal 42 for each steerable antenna system 22. That is, each steerable antenna system 22 may provide service coverage in a different geographic region and there may be a ground station 40 in each geographic region that serves as the pointing reference for the respective steerable antenna system 22 onboard the satellite 10. A further point regarding the method 700 is that the control system 28 onboard the satellite 10 may repeat the method 700 on a recurring or triggered basis, with respect to each steerable antenna system 22—repeating the operations of receiving an uplink signal 42, which may be received on a recurring basis, converting the corresponding power measurements into a power-distribution image 70, determining the pointing error from the power-distribution image 70, and deriving pointing corrections based on the determined pointing error.

Figure 11:
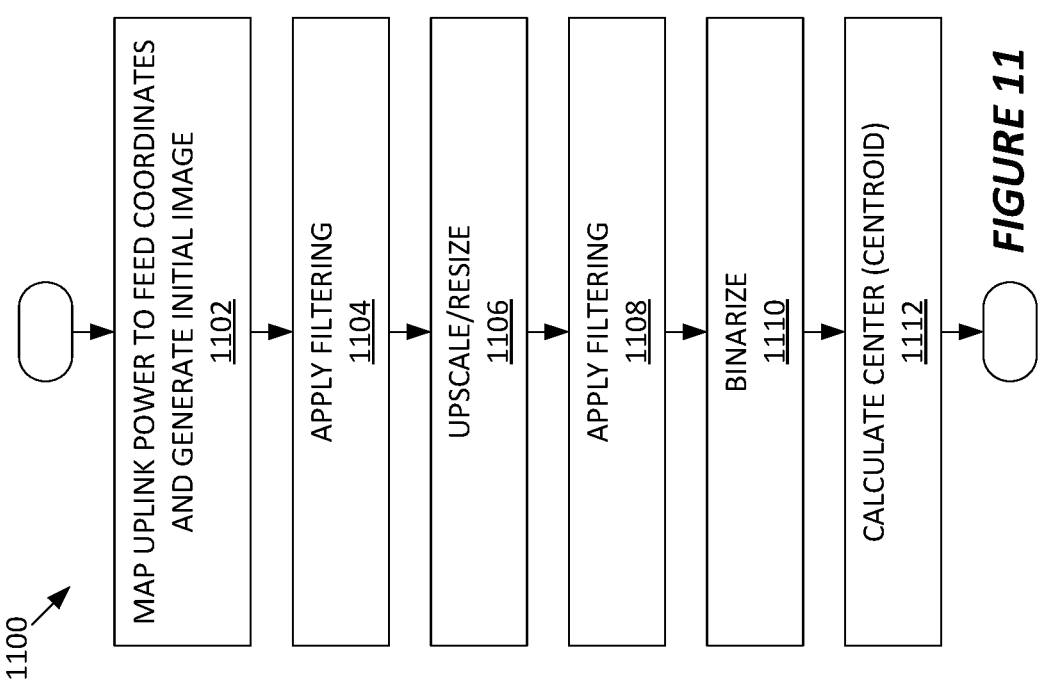
FIG. 11 is a logic flow diagram of example details for the method of FIG. 7.

FIG. 11 details a method 1100 of generating a power-distribution image 70, and may be performed as part of the method 700. Image generation according to the method 1100 includes mapping (Block 1102) uplink power to feed coordinates and generating the initial image. "Mapping" means associating the received-signal power measured for each array element 52 for reception of an uplink signal 42 with the corresponding grid positions 56 in the feed grid 54. Generating the initial image comprises converting the measured powers into pixel values for the pixels 72 occupying respective grid positions 76 in a pixel grid 74 corresponding to the feed grid 54. The pixels 72 may be arranged in a matrix or other data structure, where the ordering or arrangement of the pixels 72 represents the pixel grid 74.

The method 1100 continues with applying (Block 1104) filtering to pixels 72 in the initial image, e.g., a smoothing filter, upscaling/resizing (Block 1106) the image, applying (Block 1108) to the upscaled/resized image, and then binarizing (Block 1110) the image. The image as output from the binarizing operation is then used for identifying the illuminated region 80 of the pixel grid 74 that corresponds to the uplink signal 42, and then calculating (Block 1112) the center of the illuminated region 80, e.g., using a centroid formula. The center location 82 can then be expressed in feed-grid coordinates and compared with the reference location 62, which may also be expressed in feed-grid coordinates, to determine the pointing error of the involved steerable antenna system 22.

Figure 12:
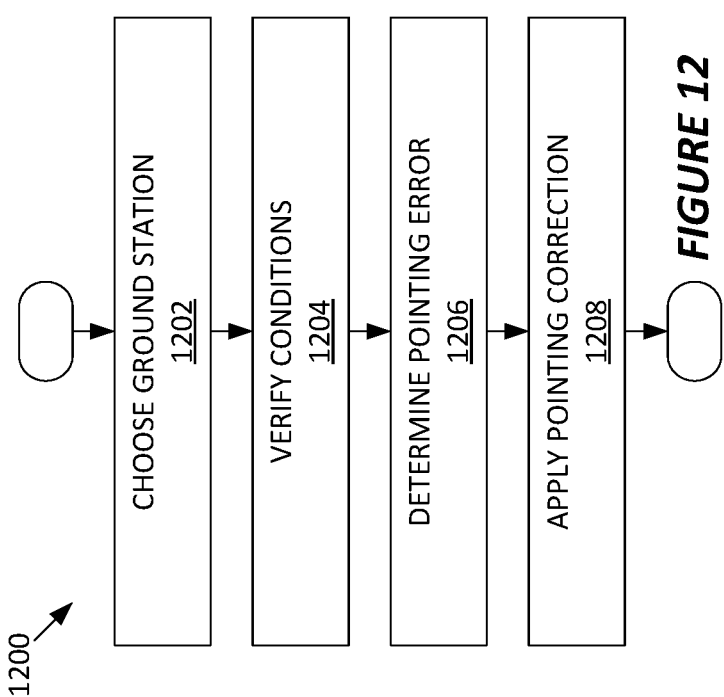
FIG. 12 is a logic flow diagram of an overall method of operation for steering a steerable antenna system, according to one embodiment.

FIG. 12 illustrates a method 1200 performed by the satellite 10, with the method 1200 including choosing (Block 1202) a ground station 40 to use as a pointing reference for a steerable antenna system 22 onboard the satellite 10, and verifying (Block 1204) that all of one or more conditions for determining pointing corrections with respect to the pointing reference are fulfilled. Condition monitoring includes, for example, checking for one or more fault conditions that interfere with or prevent checking and correcting the pointing direction of the involved steerable antenna system 22, which also may be referred to as "antenna tracking." Assuming the absence of fault conditions, the method 1200 continues with determining (Block 1206) the pointing error—e.g., according to the method 700—and applying (Block 1208) the pointing correction— e.g., commanding one or more servos of other positioning controls according to the determined pointing error.

Figure 13:
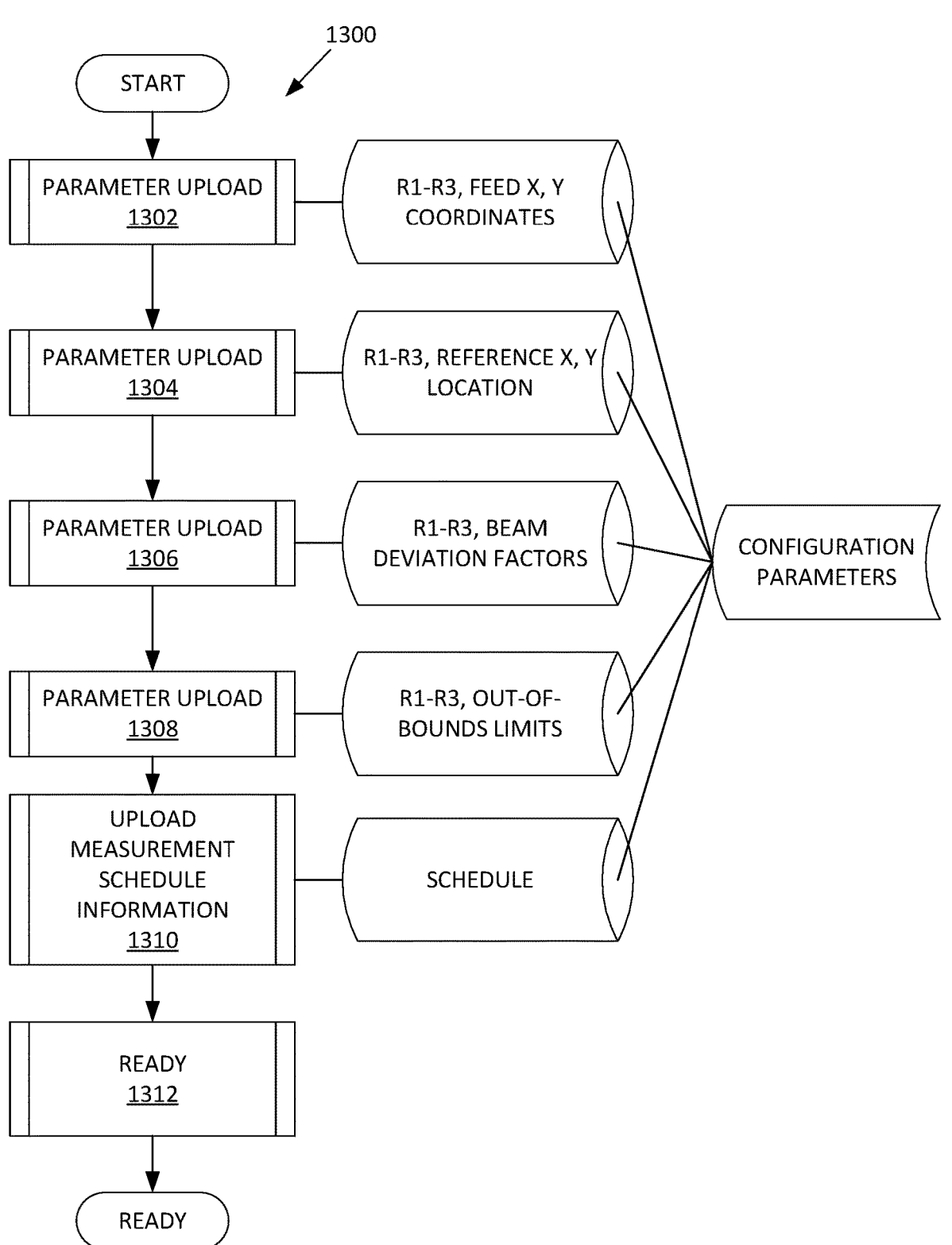
FIG. 13 is a logic flow diagram of a method of obtaining configuration parameters, for use in performing antenna steering, according to one embodiment.

FIG. 13 illustrates a method 1300 performed by the satellite 10, with the illustrated processing representing an example approach to initialization. The processing may be performed as an initial part of the method 700 or performed in advance of performing the method 700 and it is based on example scenario involving three steerable antenna systems 22, each including a movable reflector R. Hence, "R1" denotes the reflector in a first one of the steerable antenna systems 22, "R2" denotes the reflector in a second one of the steerable antenna systems 22, and "R3" denotes the reflector in a third one of the steerable antenna systems 22. Each reflector R is associated with corresponding antenna array 50 having array elements 52 arranged on a feed grid 54 having X and Y dimensions.

The initialization method 1300 involves performing a series of uploading operations (Blocks 1302, 1304, 1306, and 1308), to upload a set of configuration parameters, including: (1) X, Y feed-grid coordinates for each reflector R1-R3; (2) the reference location 62 to be used for steering each one of the three steerable antenna systems 22, expressed in the corresponding feed-grid coordinates; (3) the beam deviations factors applicable to each steerable antenna system 22; (4) and the out-of-bounds limits applicable to each steerable antenna system 22. Uploading operations further include uploading (Block 1310) measurement schedule information that defines times for measuring uplink signal power for pointing-error determinations. Once the parameters and scheduling information are uploaded or otherwise configured on the satellite 10, it is ready to carry out antenna tracking (Block 1312).

In an example embodiment, the antenna array 50 included in each steerable antenna system 22 has a defined number of rows and columns, e.g., 3 rows and 832 columns defining a 3×832 matrix of array elements 52. Each array element 52 may be associated with producing a forward user beam having a beam number and a feed-grid position defined by a Y position expressed in inches and an X position expressed in inches, with the position defining the location of the array element 52/beam number within the involved feed grid 54. Similarly, the reference location 62 for each steerable antenna system 22 may be expressed in X inches and Y inches.

The beam deviation factors are, for example, a 2×2 matrix for each steerable antenna system 22, expressing a delta azimuthal value and a delta elevational value. As a more detailed example, a methodology disclosed herein, such as in the embodiment shown in FIG. 7, finds the X,Y coordinate representing the illumination center of an uplink signal impinging on an antenna array 50 comprised in a steerable antenna system 22 of the satellite 10. The difference between that location and a reference location—e.g., a location that would attain if the steerable antenna system 22 was pointed correctly—gives delta x and delta y values. With offset fed reflectors, coordinate moves in x and y translate into beam moves in millidegrees, and the beam deviation factors may be expressed in degrees per inch. As such, the beam deviation factors allow the determined delta x and delta y values to be translated into angular adjustments for the reflector 51.

As for the applicable limits, they too may be expressed per steerable antenna system 22. Example limits include a lower limit on the signal level usable for antenna steering— i.e., a minimum signal level for the uplink signal 42 to be used as the pointing reference. The limits also may include an out-of-bounds error limit for each steerable antenna system 22 that prevents responding to a calculated pointing error if that error is too large according to defined error-size limit.

Figure 14:
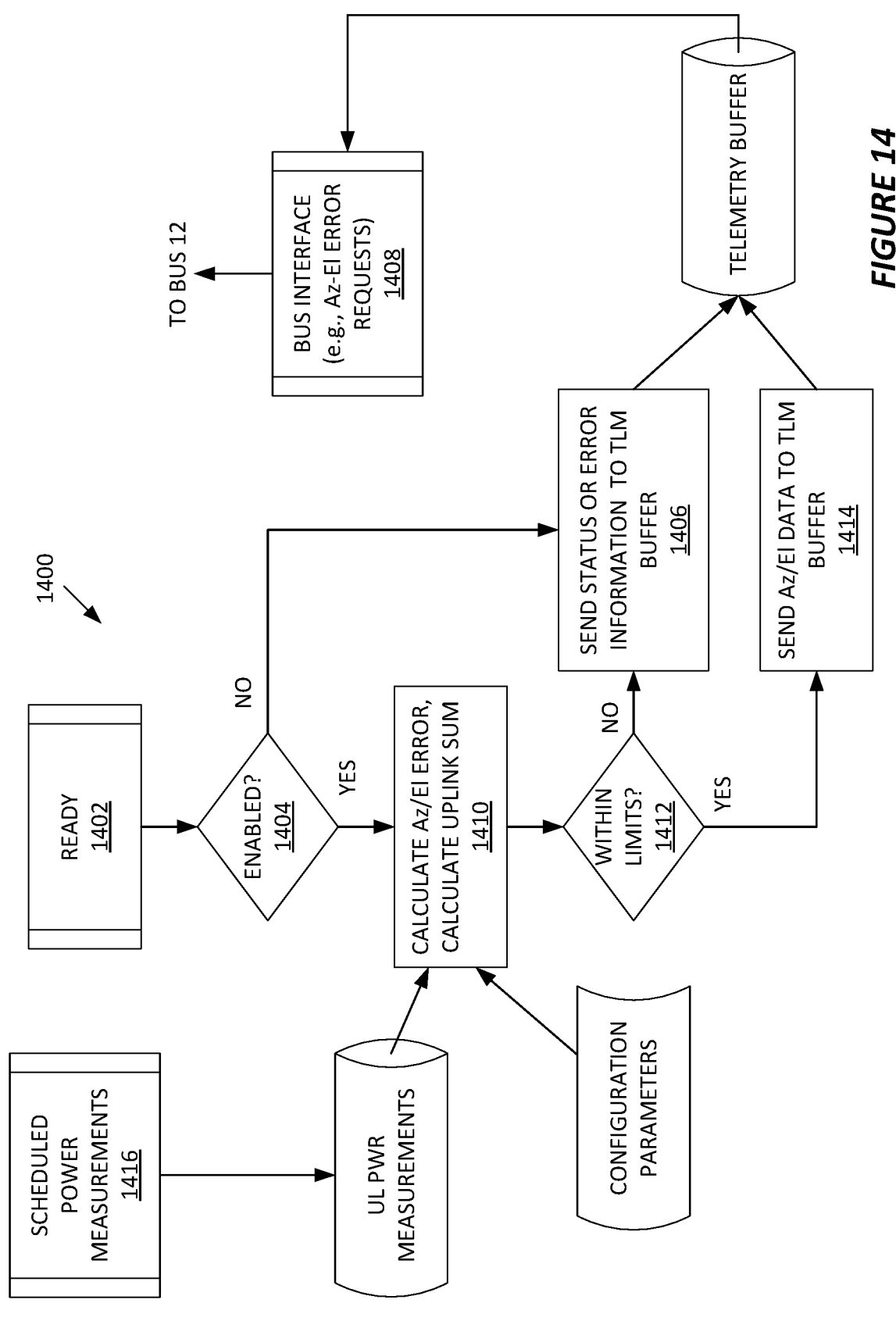
FIG. 14 is a logic flow diagram illustrating example details for carrying out the method of FIG. 12.

FIG. 14 illustrates a tracking method 1400 performed by the satellite 10 with respect to one of its steerable antenna systems 22, according to an example embodiment. The illustrated operations may be carried out by the control system 28 of the satellite payload 14, for example.

Processing begins (Block 1402) with the satellite 10 in a READY state, such as depicted in FIG. 13. There may be conditions or times during which antenna tracking is not enabled and the satellite 10 thus checks whether tracking is enabled (Block 1404). If tracking is not enabled ("NO" from Block 1404), processing advances to Block 1406, in which corresponding tracking status information is sent to a telemetry (TLM) buffer, and a bus interface subprocess (Block 1408) may report the status information to the bus 12. In the case that tracking is disabled, for example, the interface subprocess may indicate that state to the bus 12.

On the other hand, if tracking is enabled ("YES" from Block 1404) and uplink (UL) power measurements for a received uplink signal are available for the steerable antenna system 22, the method 1400 continues with calculating the pointing error (Block 1410). The pointing error is expressed as an azimuthal error (Az) and an elevational error (El) for the angular settings of the reflector 51 included in the involved steerable antenna system 22, and the computation of the pointing error relies on the image-generation method 700, using the configuration data detailed in FIG. 13. Block 1410 may further include calculating an "uplink sum" by summing the per-element received signal power measurements used in computing the pointing error, to ensure that the measured uplink signal had sufficient power for use as a pointing reference. Here, note that a power measurement subprocess (Block 1416) runs according to the uploaded scheduling information—i.e., it performs uplink signal power measurements for the steerable antenna system 22 at scheduled times and stores those measurements in a memory that is read from, for carrying out the calculations in Block 1410.

If the calculated pointing error is within defined limits and the uplink sum satisfies a defined threshold power level ("YES" from Block 1412), then the computed pointing error (Az-El error) is sent to the TLM buffer (Block 1414), and the interface subprocess (Block 1408) sends a corresponding Az-El error request to the bus 12, with a corresponding antenna steering controller 38 of the bus 12 translating the Az-El error request into adjustments (control signaling) for revising the pointing direction of the steerable antenna system 22.

Figure 15:
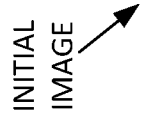
FIG. 15 is a diagram of an example initial image for further processing to obtain a power-distribution image, according to one embodiment.

FIG. 15 illustrates an example "initial" image obtained in the process of generating a power-distribution image 70, where there is an initial set of pixels 72. Each pixel 72 corresponds to a grid position 56 in the feed grid 54 of the involved antenna assembly 24, and its pixel value is a digital value representing the received-signal power measured on the corresponding array element 52 in the antenna array 50. Hence, the pixels 72 corresponding to unoccupied/empty grid positions 56 have a zero value. The pixel values may be based on converting analog measurements of received-signal power on each array element 52 to a digital value using an 8-bit analog-to-digital (A/D) converter, for example.

Figure 16:
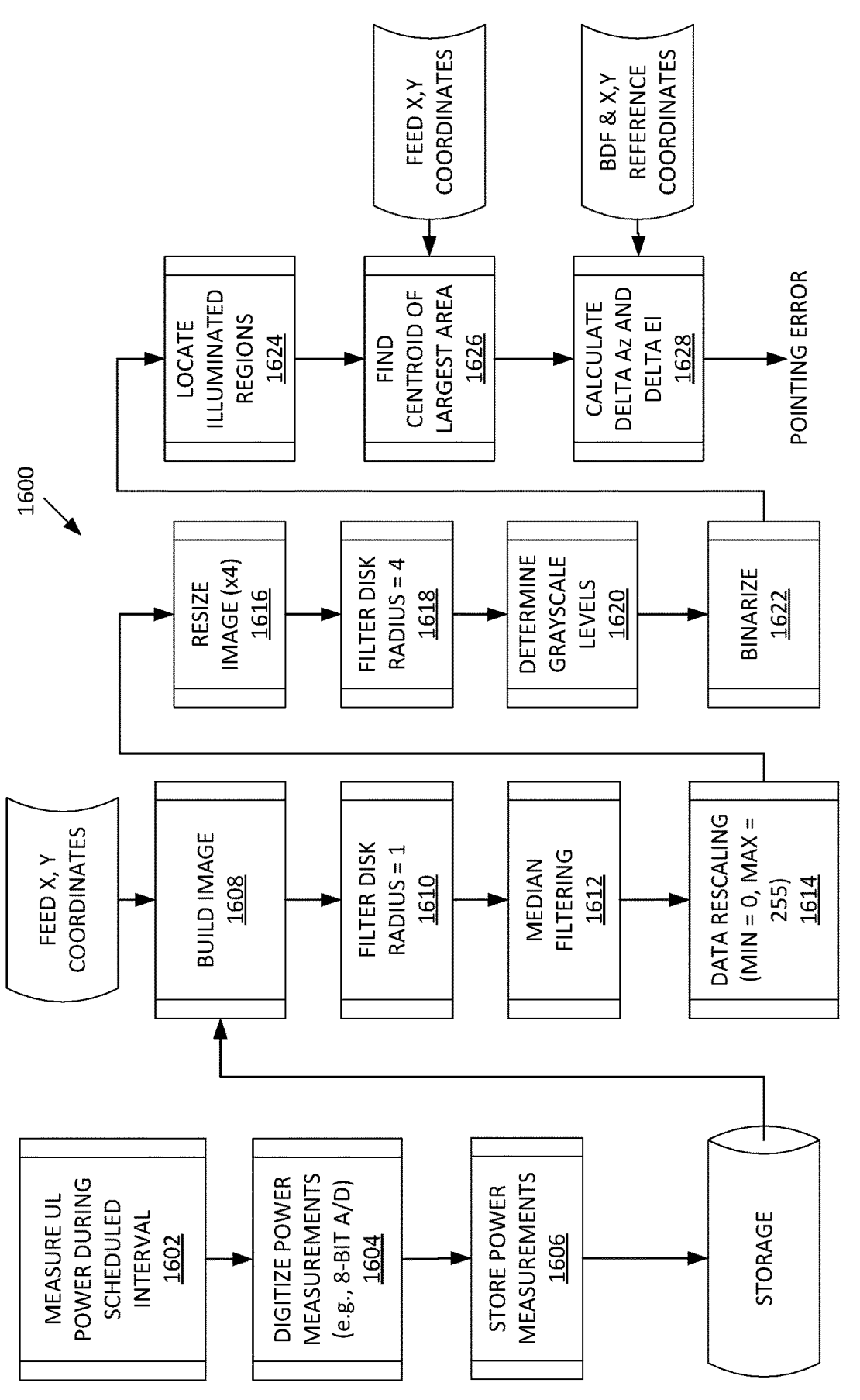
FIG. 16 is a logic flow diagram of example details of obtaining an initial image of the sort illustrated in FIG. 15 and example details for further processing, according to one embodiment.

FIG. 16 illustrates a detailed example according to one embodiment, for processing the initial image shown in FIG. 15, to obtain a final power-distribution image 70 that is used to evaluate the pointing error. Although FIG. 16 illustrates particular filter types and filtering parameters, such details shall be understood as an example configuration. Other filter types or parameterizations may be used. Indeed, one or more embodiments include fewer filtering operations or omit filtering. Further, rather than implement the gray scaling and binarizing operations depicted in FIG. 16, one or more embodiments perform "color" image processing, such as where the different uplink power measurements made on a per-element basis are mapped into power ranges that correspond to different colors. Such an approach may be understood as generating a color "heat map" image, for analysis.

In any case, the illustrated processing includes measuring (Block 1602) uplink (UL) power during a scheduled interval—e.g., during a quiescent interval during which the only signal purposefully received by the involved steerable antenna system 22 is an uplink signal 42 originating from a ground station 40 that serves as a pointing reference for the steerable antenna system 22. Of course, the steerable antenna system 22 may receive one or more spurious signals during this interval, which may be defined according to the corresponding playlist uploaded to the satellite 10, along with the other relevant configuration data.

Processing continues with digitizing (Block 1604) the power measurements and storing them (Block 1606), for use in building an initial image (Block 1608), such as the one shown in FIG. 15. Once the initial image is generated, a series of processing operations to smooth the image and increase its resolution—i.e., upscaling is performed. However, although upscaling creates a pixel grid 74 containing more pixels 72 than there are grid positions 56 in the feed grid 54, there remains a defined mapping that translates grid positions 76 into the feed grid 56 and vice versa, e.g., every grid position 56 in the feed grid 54 is represented by grid positions 76 in the (upscaled) pixel grid 74.

A first operation applied to the basic or initial image from FIG. 15 is a first filtering operation (Block 1610) applied to the pixels 72, using a filter "disk" having a radius of one. The disk filter is a two-dimensional (2D) filter exemplified by the below table:

| | | |
|---|---|---|
| 0.08 | 0.46 | 0.08 |
| 0.46 | 1.00 | 0.46 |
| 0.08 | 0.46 | 0.08 |

Figure 17:
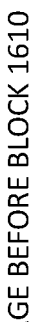
FIGS. 17-20 are image plots illustrating example effects of the image-processing steps detailed in FIG. 16.

FIG. 17 illustrates the effect of the filtering applied in Block 1610.

Image filtering continues with the application of a median filter (Block 1612), e.g., a nine-point media filter as depicted below:

| | | |
|---|---|---|
| $i(x_{-1}, y_1)$ | $i(x_0, y_1)$ | $i(x_1, y_1)$ |
| $i(x_{-1}, y_0)$ | $i(x_0, y_0)$ | $i(x_1, y_0)$ |
| $i(x_{-1}, y_{-1})$ | $i(x_0, y_{-1})$ | $i(x_1, y_{-1})$ |

Figure 18:
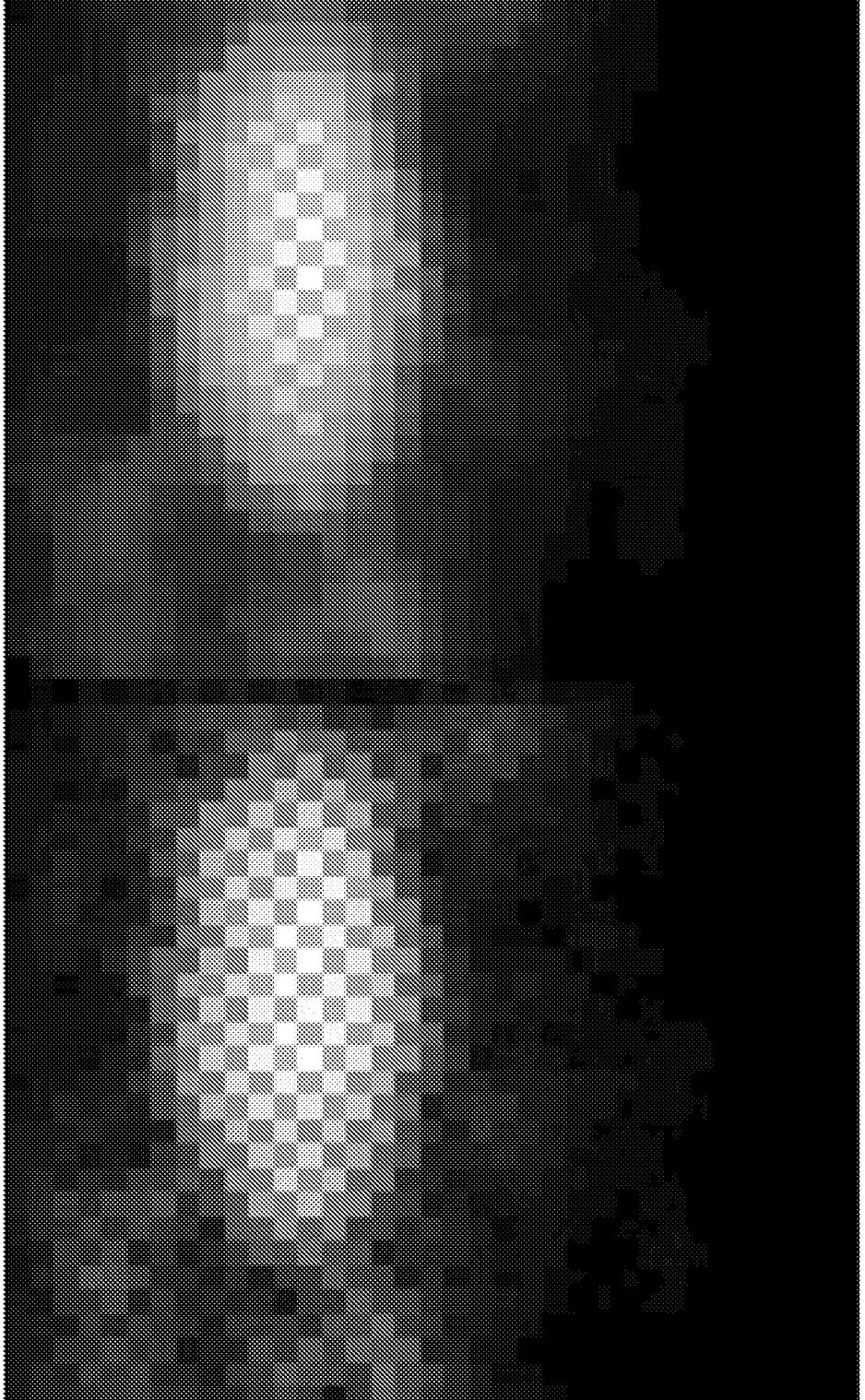

FIG. 18 illustrates application of the median filter of Block 1612.

Image processing continues with rescaling the pixel data (Block 1614), e.g., based on a minimum pixel value of 0 and a maximum pixel value of 255, resizing (Block 1616) the image, e.g., upscaling by a factor of four, and applying (Block 1618) a radius-4 disk filter to the upscaled image. An example disk (circular) filter appears below:

| | | | | | | | | |
|---|---|---|---|---|---|---|---|---|
| 0.00 | 0.00 | 0.05 | 0.36 | 0.49 | 0.36 | 0.05 | 0.00 | 0.00 |
| 0.00 | 0.21 | 0.90 | 1.00 | 1.00 | 1.00 | 0.90 | 0.21 | 0.00 |
| 0.05 | 0.90 | 1.00 | 1.00 | 1.00 | 1.00. | 1.00 | 0.90 | 0.05 |
| 0.36 | 1.00 | 1.00 | 1.00 | 1.00 | 1.00 | 1.00 | 1.00 | 0.36 |
| 0.49 | 1.00 | 1.00 | 1.00 | 1.00 | 1.00 | 1.00 | 1.00 | 0.49 |

-continued

| | | | | | | | | |
|---|---|---|---|---|---|---|---|---|
| 0.36 | 1.00 | 1.00 | 1.00 | 1.00 | 1.00 | 1.00 | 1.00 | 0.36 |
| 0.05 | 0.90 | 1.00 | 1.00 | 1.00 | 1.00 | 1.00 | 0.90 | 0.05 |
| 0.00 | 0.21 | 0.90 | 1.00 | 1.00 | 1.00 | 0.90 | 0.21 | 0.00 |
| 0.00 | 0.00 | 0.05 | 0.36 | 0.49 | 0.36 | 0.05 | 0.00 | 0.00 |

Figure 19:

FIG. 19 illustrates the image after the processing of Blocks 1614, 1616, and 1618, with the resulting image then processed according to the processing of Block 1620, which involves a grayscale determination. The right-side image shown in FIG. 19 illustrates the results of gray-scaling (Block 1620).

Figure 20:
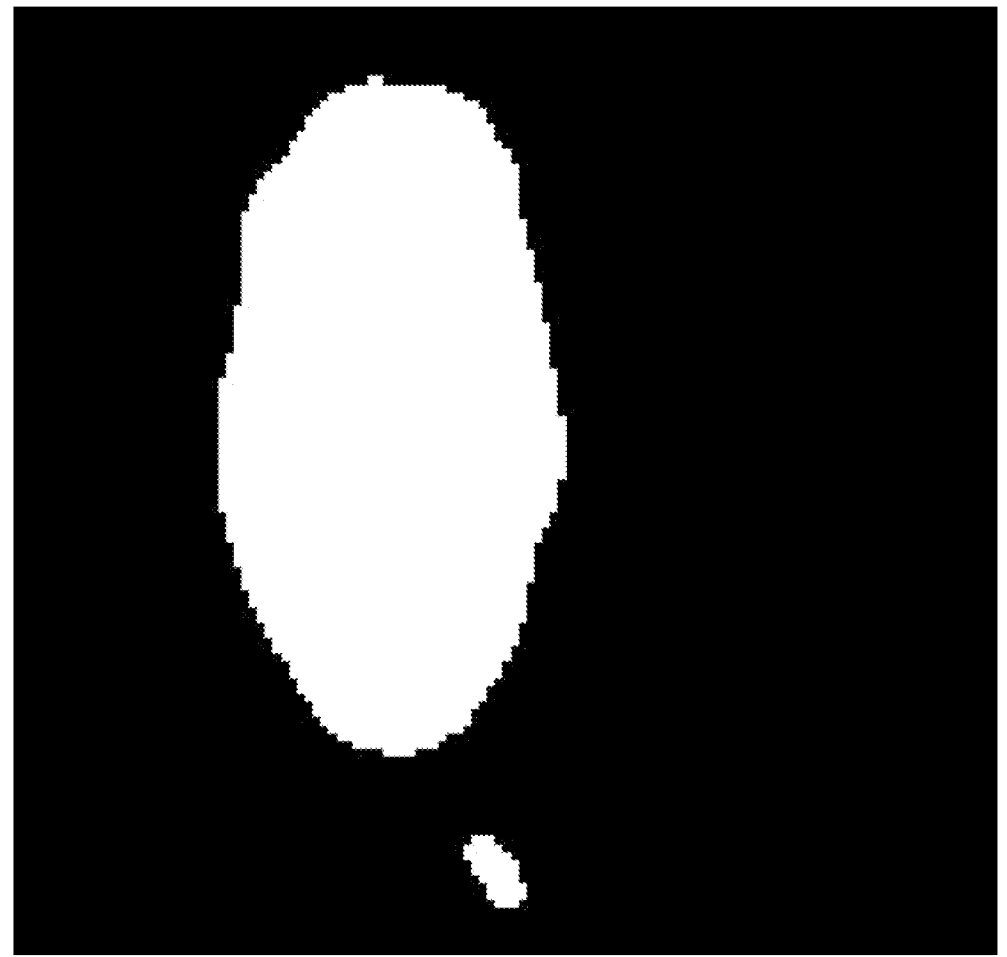

FIG. 20 illustrates the results of binarizing (Block 1622) the grayscale image. A notable aspect of FIG. 20 is that it illustrates that there may be more than one illuminated region in the binarized image. This possibility is handled in the processing of Block 1624, which involves locating the illuminated regions within the binarized image, and finding the center (centroid) of the largest one among the illuminated regions (Block 1626). This logic can be understood as taking the largest one among the two or more illuminated regions in the binarized image as representing the uplink signal 42.

Once the center location 82 of the largest illuminated region is determined, the difference between the center location 82 and the reference location 62 applicable to the feed grid 54 associated with the subject steerable antenna system 22 is determined and used to calculate the pointing correction. The pointing correction according to Block 1628 comprises determining the delta Az (azimuthal) and delta El (elevational) adjustments for the reflector 51 of the subject steerable antenna system 22.

Thus, the Az/El determination process represented by FIG. 16 can be understood as: (1) receiving an uplink signal 42 during a "special time" when no other transmissions from the ground are present (in the involved frequency band); (2) using one or more radiofrequency (RF) power detectors to measure the received-signal power on individual array elements 52 of the antenna array 50, where the detection bandwidth may be narrowband or wideband, and continuous wave or modulated waveforms may be involved; and (3) the control system 28, which may include or comprise a "payload processor," collecting the power measurements and using an algorithm that converts the measurements into a power-distribution image 70, to determine the "uplink location" in feed-grid coordinates.

The azimuth and elevation error is then determined as:

$$Az\ Error=(X-X_R)*Az\_X\_BDF+(Y-Y_R)*Az\_Y\_BDF,$$
and $$El\ Error=(X-X_R)*El\_X\_BDF+(Y-Y_R)*Az\_Y\_BDF.$$

where $X_R$ and $Y_R$ are the coordinates of the reference locationg 62, and where BDF=beam deviation factors. The beam deviation factors are based on the reflector geometry. Once the adjustments are determined, they are used either to actuate antenna or spacecraft body mechanisms, to obtain the calculated pointing correction.

Consider the below table, which illustrates an example pointing correction:

| | Latitude | Longitude | | Az | El |
|---|---|---|---|---|---|
| Boresight | 37.31059 | −109.026 | → geometry | −3.85 | 5.8 |
| Known error | | | | −0.5 | −0.4 |

-continued

| | Latitude | Longitude | | | Az | El |
|---|---|---|---|---|---|---|
| New boresight | 34.34424 | −111.997 | geometry ← | | −4.35 | 5.4 |

With the above example details in mind, a satellite 10 according to one or more embodiments comprises a steerable antenna system 22 that includes an antenna array 50 and is configured to receive an uplink signal 42 that illuminates a particular region of the antenna array 50 in dependence on a current pointing direction of the steerable antenna system 22. The antenna array 50 comprises a plurality of array elements 52 arranged according to a feed grid 54, and the satellite 10 further includes a control system 28 that is configured to convert received-signal power measurements made for individual array elements 52 of the antenna array 50 during reception of the uplink signal 42 into a power-distribution image 70 comprising pixels 72 arranged on a pixel grid 74. The pixel grid 74 is derived from the feed grid 54, e.g., either a one-to-one correspondence or an upscaled correspondence. In either case, the pixels 72 have pixel values determined in dependence on the received-signal power measurements made for corresponding ones of the array elements 52. The control system 28 is further configured to determine a center location 82 of an illuminated region 80 in the power-distribution image 70 that corresponds to the uplink signal 42. Still further, with the center location 82 expressed in feed-grid coordinates, the control system 28 is configured to derive a pointing correction for the steerable antenna system 22 in dependence on a difference 84 between the center location 82 and a reference location 62 that also is expressed in feed-grid coordinates.

As shown in the introductory example depiction of FIGS. 1A and 1B, the control system 28 in one or more embodiments comprises processing circuitry 30, which may include or be associated with storage 32. In at least one embodiment, the processing circuitry 30 comprises one or more microprocessors or other digital processors that is/are specially adapted to carry out the image-generation and pointing-correction determinations described herein—i.e., to convert received-signal power measurements into a power-distribution image 70 that represents the antenna array 50 and corresponding feed grid 54 within the antenna assembly 24 of a steerable antenna system 22, and to use that image to determine pointing corrections for the steerable antenna system 22. As shown, such pointing corrections may comprise azimuthal and elevational adjustments to a reflector 51 that effectively controls the pointing direction of the involved antenna array 50.

Broadly, the control system 28 in one or more embodiments is configured to perform any one or more of the operations detailed in any one or more of the methods 700, 1100, 1200, 1300, 1400, and 1600. For example, the storage 32 stores one or more computer programs 34 comprising program instructions that, when executed by the one or more microprocessors or other digital processors comprising the processing circuitry 30, cause such processor(s) to perform the method operations.

Thus, in at least one embodiment, the control system 28 comprises processing circuitry 30 that is configured according to the execution of computer program instructions held in storage 32. However, whether implemented in fixed circuitry, programmatically-configured circuitry, or a mix of both, in one or more embodiments, the control system 28 is configured determine the center location 82 of the illuminated region 80 in the power-distribution image 70 by calculating the centroid of the illuminated region 80. As noted, the control system 28 may be configured to determine the center location 82 based on identifying the illuminated region 80 from among two or more illuminated regions that are present in the power-distribution image 70 as a result of the steerable antenna system 22 receiving signal energy from more than one signal source, while the received-signal power measurements are made. For example, the control system 28 is configured to identify the illuminated region 80 that corresponds with the uplink signal 42 by, for the two or more illuminated regions, comparing respective sizes of the two or more illuminated regions.

In one or more embodiments, the control system 28 is configured to convert the received-signal power measurements into the power-distribution image 70 by mapping the individual received-signal power measurements to a first set of pixels 72, each pixel 72 in the first set of pixels 72 corresponding to a populated grid position 56 in the feed grid 54 and having a pixel value corresponding to the received-signal measurement made for the array element 52 at that populated grid position 56. Further, in at least one such embodiment, the control system 28 is configured to create an expanded, second set of pixels 72 encompassing the first set of pixels 72 and additional pixels 72 corresponding to unpopulated grid positions 56 in the feed grid 54, each additional pixel 72 having a pixel value derived from one or more neighboring pixels 72 in the first set of pixels 72. Still further, in at least one embodiment, the control system 28 is configured to create an up-sampled image by generating multiple pixels 72 for each grid position 56 in the feed grid 54. Creating new, additional pixels 72 comprises, for example, interpolating and extrapolating pixel values from the existing, neighboring pixels 72.

Of course, for smoothing purposes, the control system 28 in one or more embodiments is configured to filter the up-sampled image, to obtain the power-distribution image 70 used for determining the center location 82 of the illuminated region 80 that corresponds to the uplink signal 42. Such processing may also include binarizing the up-sampled image, e.g., after smoothing and gray-scaling operations, to produce a distinct and relatively smooth on/off boundary defining the illuminated region 80.

Having a regularly-shaped illumination region 80 that is defined by a clean on/off pixel boundary aids in accurate determination of the center location 82 of the illuminated region 80. Correspondingly, in one or more embodiments, generating the power-distribution image 70 may comprise the following processing operations: (1) obtain received-signal power measurements for occupied grid positions 56 of the feed grid 54—i.e., grid positions 56 that have an array element 52; (2) create an initial image having one pixel grid position 76 for each feed grid position 56, where the pixels 72 at pixel grid positions 76 corresponding to occupied feed grid positions 56 have a digitized value corresponding to the power measurement made for that position and where pixels 72 at pixel grid positions 76 corresponding to unoccupied feed grid positions 56 have a zero value ("null" pixels); (3) use the non-zero pixel values to interpolate/extrapolate values for the null pixels 72; (4) perform initial smoothing (filtering) of the resulting intermediate image; (5) upscale the intermediate image to increase pixel resolution; (6) smooth the upscaled image and gray-scale it; and (7) binarize the gray-scaled image, with the resulting "black-and-white" image, where each pixel 72 is "on" or "off," taken as the power-distribution image 70 to use for identifying the illuminated region 80 corresponding to the uplink signal 42.

In one or more embodiments, the control system 28 is configured to derive pointing corrections for the steerable antenna system 22 on a recurring basis, based on recurring receptions of the uplink signal 42. See, for example, the slot playlist information uploaded to the satellite 10 as configuration information in Block 1310 of FIG. 13. That is, there may be special slots defined by a schedule, wherein the uplink signal 42 is the only uplink signal transmitted to the involved steerable antenna system 22 during the special slots, so that the uplink signal 42 is cleanly discernable in the generated power-distribution image 70.

Once the power-distribution image 70 is generated, the control system 28 according to one or more embodiments is configured to derive the pointing correction for the steerable antenna system 22 based on computing a horizontal offset in feed-grid coordinates between the center location 82 and the reference location 62 on a horizontal axis defined by the feed grid 54, computing a vertical offset in feed-grid coordinates between the center location 82 and the reference location 62 on a vertical axis defined by the feed grid 54, and translating the horizontal and vertical offsets into corresponding azimuthal and elevational pointing adjustments for the steerable antenna system 22. Further, the control system 28 is configured to actuate, or initiate actuation of, a steering mechanism of the steerable antenna system 22, according to one or more actuator control signals determined as a function of the pointing correction.

In at least one embodiment, the communication circuitry 20 of the satellite 10 performs downlink beamforming via the steerable antenna system 22, to provide a set of forward user beams 90 defining corresponding forward user beam coverage areas 92. Here, the pointing direction of the steerable antenna system 22 defines the geographical coordinates of an aggregate coverage area 94 defined by the set of forward user beams 90.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A satellite comprising:
a steerable antenna system that includes an antenna array and is configured to receive an uplink signal that illuminates a particular region of the antenna array in dependence on a current pointing direction of the steerable antenna system, and wherein the antenna array comprises a plurality of array elements arranged according to a feed grid; and
a control system configured to:
convert received-signal power measurements made for individual array elements of the antenna array during reception of the uplink signal into a power-distribution image comprising pixels arranged on a pixel grid derived from the feed grid and having pixel values determined in dependence on the received-signal power measurements made for corresponding ones of the array elements;

determine a center location of an illuminated region in the power-distribution image that corresponds to the uplink signal, the center location expressed in feed-grid coordinates; and
derive and apply a pointing correction for the steerable antenna system in dependence on a difference between the center location and a reference location that also is expressed in feed-grid coordinates.

2. The satellite according to claim 1, wherein the control system comprises processing circuitry that is configured according to the execution of computer program instructions held in storage.

3. The satellite according to claim 1, wherein the control system is configured to determine the center location by calculating the centroid of the illuminated region.

4. The satellite according to claim 1, wherein the control system is configured to determine the center location based on identifying the illuminated region from among two or more illuminated regions that are present in the power-distribution image as a result of the steerable antenna system receiving signal energy from more than one signal source, while the received-signal power measurements are made.

5. The satellite according to claim 4, wherein the control system is configured to identify the illuminated region that corresponds with the uplink signal by, for the two or more illuminated regions, comparing respective sizes of the two or more illuminated regions.

6. The satellite according to claim 1, wherein the control system is configured to convert the received-signal power measurements into the power-distribution image by mapping the individual received-signal power measurements to a first set of pixels, each pixel in the first set of pixels corresponding to a populated grid position in the feed grid and having a pixel value corresponding to the received-signal measurement made for the array element at that populated grid position.

7. The satellite according to claim 6, wherein, to convert the received-signal power measurements into the power-distribution image, the control system is further configured to create an expanded, second set of pixels encompassing the first set of pixels and additional pixels corresponding to unpopulated grid positions in the feed grid, each additional pixel having a pixel value derived from one or more neighboring pixels in the first set of pixels.

8. The satellite according to 6, wherein, to convert the received-signal power measurements into the power-distribution image, the control system is further configured to create an up-sampled image by generating multiple pixels for each grid position in the feed grid.

9. The satellite according to claim 8, wherein the control system is configured to filter the up-sampled image, to obtain the power-distribution image used for determining the center location of the illuminated region that corresponds to the uplink signal.

10. The satellite according to claim 8, wherein the control system is configured to binarize the up-sampled image to obtain the power-distribution image, and identify, within the power-distribution image, the illuminated region that corresponds to the uplink signal.

11. The satellite according to claim 1, wherein the control system is configured to derive pointing corrections for the steerable antenna system on a recurring basis, based on recurring receptions of the uplink signal.

12. The satellite according to claim 1, wherein the control system is configured to derive the pointing correction for the steerable antenna system based on computing a horizontal offset in feed-grid coordinates between the center location and the reference location on a horizontal axis defined by the feed grid, computing a vertical offset in feed-grid coordinates between the center location and the reference location on a vertical axis defined by the feed grid, and translating the horizontal and vertical offsets into corresponding azimuthal and elevational pointing adjustments for the steerable antenna system.

13. The satellite according to claim 1, wherein the control system is configured to actuate, or initiate actuation of, a steering mechanism of the steerable antenna system, according to one or more actuator control signals determined as a function of the pointing correction.

14. The satellite according to claim 1, wherein communication circuitry of the satellite performs downlink beamforming via the steerable antenna system, to provide a set of forward user beams defining corresponding forward user beam coverage areas, and wherein the pointing direction of the steerable antenna system defines the geographical coordinates of an aggregate coverage area defined by the set of forward user beams.

15. The satellite according to claim 1, wherein the steerable antenna system comprises one among multiple steerable antenna systems onboard the satellite, and wherein the control system is configured to determine pointing corrections for each steerable antenna system, based on receiving a respective uplink signal for each steerable antenna system.

\*　\*　\*　\*　\*